United States Patent
Oon et al.

(10) Patent No.: US 7,609,291 B2
(45) Date of Patent: Oct. 27, 2009

(54) DEVICE AND METHOD FOR PRODUCING AN ENHANCED COLOR IMAGE USING A FLASH OF INFRARED LIGHT

(75) Inventors: Chin Hin Oon, Penang (MY); Kean Loo Keh, Penang (MY); Farn Hin Chen, Perak (MY); Eit Thian Yap, Penang (MY); Gim Eng Chew, Penang (MY); Kee Yean Ng, Penang (MY); Thye Linn Mok, Penang (MY); Wool Kin Goon, Penang (MY); Rene P. Helbing, Palo Alto, CA (US); Janet Bee Yin Chua, Perak (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 607 days.

(21) Appl. No.: 11/296,635

(22) Filed: Dec. 7, 2005

(65) Prior Publication Data
US 2007/0127908 A1 Jun. 7, 2007

(51) Int. Cl.
H04N 5/33 (2006.01)
G03B 15/03 (2006.01)
H04N 7/18 (2006.01)

(52) U.S. Cl. .................. 348/164; 396/155; 348/162
(58) Field of Classification Search ................ 340/435; 348/164, 162; 396/155
See application file for complete search history.

(56) References Cited

U.S. PATENT DOCUMENTS

| 4,866,285 A | 9/1989 | Simms |
| 6,089,715 A * | 7/2000 | Hoover et al. ............... 351/221 |
| 6,150,930 A * | 11/2000 | Cooper ....................... 340/435 |
| 6,292,535 B1 * | 9/2001 | Williams et al. ........... 378/98.8 |
| 2004/0161145 A1 * | 8/2004 | Embler ....................... 382/165 |
| 2005/0040333 A1 * | 2/2005 | Fleury et al. ................ 250/332 |

FOREIGN PATENT DOCUMENTS

JP 11103464 A * 4/1999

* cited by examiner

Primary Examiner—Timothy J Henn
Assistant Examiner—Mekonnen Dagnew (57) ABSTRACT

A device and method for producing an enhanced color image of a scene of interest captures a grayscale image of the scene of interest using a flash of infrared light and a color image of the scene of interest without using any flash of infrared light. The grayscale information from the grayscale image and the visible color information from the color image are combined to produce the enhanced color image.

19 Claims, 6 Drawing Sheets

DEVICE AND METHOD FOR PRODUCING AN ENHANCED COLOR IMAGE USING A FLASH OF INFRARED LIGHT

BACKGROUND OF THE INVENTION

Digital cameras have become ubiquitous consumer products. In fact, digital cameras have now been incorporated into other consumer products, such as cellular phones and personal digital assistance (PDA) devices. Some of the reasons for this wide use of digital cameras include lower operating cost (no films required), instant review of captured images, ease of digital image processing and ease of image distribution via the Internet. However, digital cameras have challenges similar to conventional film cameras, such as capturing image in low lighting conditions.

There are a number of techniques available when capturing an image of a scene of interest in a low lighting condition using a digital camera. One technique is to use an electronic flash to brighten the scene of interest. This technique works well when taking a picture of a nearly subject, such as a person in close proximity to the camera. However, the use of a flash of light is intrusive and inappropriate in certain situations.

Another technique to capture an image of a scene of interest in a low lighting condition is to use a long exposure time to capture the image so that enough light can be received by the camera to produce a proper image of a scene of interest. However, the long exposure time subjects the camera to movements caused by the unsteadiness of the person taking the picture. Thus, it is common for the resulting image to appear blurry, which significantly degrades the quality of the captured image.

Another technique to capture an image of a scene of interest in a low lighting condition is to use an infrared flash to illuminate the scene of interest with a flash of infrared light. Using a flash of infrared light eliminates the need for a long exposure time to capture an image in a low lighting condition. Thus, using a flash of infrared light can significantly improve the image quality of the captured image. Furthermore, since infrared light cannot be seen, using a flash of infrared light is not intrusive as a flash of visible light. However, these advantages come with a price since the resulting image using a flash of infrared light will be monochromatic.

In view of these concerns, what is needed is a device and method for capturing a high-quality color image of a scene of interest in a low lighting condition without using an intrusive flash of visible light.

SUMMARY OF THE INVENTION

A device and method for producing an enhanced color image of a scene of interest captures a grayscale image of the scene of interest using a flash of infrared light and a color image of the scene of interest without using any flash of infrared light. The grayscale information from the grayscale image and the visible color information from the color image are combined to produce the enhanced color image. The device and method allows a user to capture a high-quality color image even under a low lighting condition.

A device for producing an enhanced color image of a scene of interest in accordance with an embodiment of the invention comprises an infrared flash configured to produce a flash of infrared light, a color image sensor configured to electronically capture images, and a processor operatively coupled to the infrared flash and the color image sensor to control the infrared flash and the color image sensor to capture a grayscale image of the scene of interest using the flash of infrared light and a color image of the scene of interest without using any flash of infrared light. The processor is further configured to combine grayscale information from the grayscale image with visible color information from the color image to produce the enhanced color image of the scene of interest.

A method for producing an enhanced color image of a scene of interest in accordance with an embodiment of the invention comprises emitting a flash of infrared light at the scene of interest, electronically capturing a grayscale image of the scene of interest using the flash of infrared light, electronically capturing a color image of the scene of interest without using any flash of infrared light, and combining grayscale information from the grayscale image with visible color information from the color image to produce the enhanced color image of the scene of interest.

Other aspects and advantages of the present invention will become apparent from the following detailed description, taken in conjunction with the accompanying drawings, illustrated by way of example of the principles of the invention.

DETAILED DESCRIPTION

Figure 1:
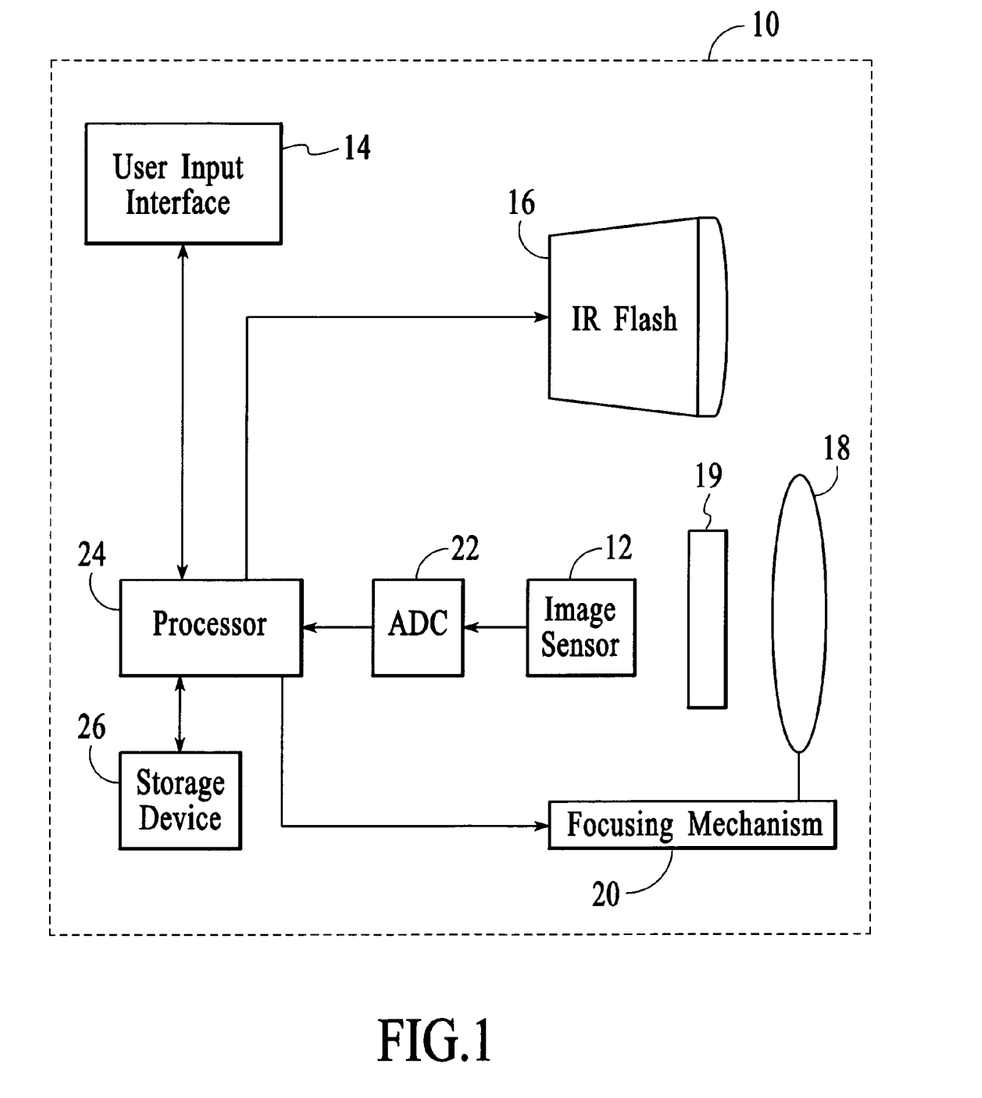
FIG. 1 is a block diagram of a digital imaging device in accordance an embodiment of the invention.

With reference to FIG. 1, a digital imaging device 10 in accordance with an embodiment of the invention is described. The digital imaging device 10 may be any type of a digital imaging device, such as a digital camera, a digital video camera or a camera phone. As described in more detail below, the digital imaging device 10 is designed to produce high-quality color images, even when the images are captured under low lighting conditions.

As shown in FIG. 1, the imaging device 10 includes a user input interface 14, an infrared (IR) flash 16, a lens 18, an IR filter 19, a focusing mechanism 20, a color image sensor 12, an analog-to-digital converter (ADC) 22, a processor 24 and a storage device 26. The user input interface 14 allows a user to input commands and/or selections into the imaging device 10. The user input interface 14 may include any type of input devices, such as buttons, dials, levers, switches and a touch screen display with graphical controls. The IR flash 16 operates to produce flashes of infrared light to provide illumination during low lighting conditions. The IR flash 16 may be an integrated component of the imaging device 10. Alternatively, the IR flash 16 may be an external device that can be attached to the imaging device 10 when needed. The IR flash 16 can be set using the user input interface 14 to be automatically activated by the processor 24 when lighting conditions warrant the use of the IR flash.

The lens 18 is used to focus a scene of interest onto the color image sensor 12 to capture an image of that scene. The focusing mechanism 20 operates to move the lens 18 to focus the lens with respect to the scene of interest. The focusing mechanism 20 can be controlled manually using the user input interface 14 or automatically by the processor 24.

The IR filter 19 is used to filter out IR light so that IR light does not reach the color image sensor 12. The IR filter 19 is connected to a mechanism (not shown) to selectively position the IR filter in front of the color image sensor 12 when IR filtering is desired. When IR filtering is not desired, the IR filter 19 is moved out of the way to allow IR light to reach the color image sensor 12. In an alternative embodiment, the IR filter 19 is implemented as a lens cap to be manually placed in front of the lens by the user when IR filtering is desired.

Figure 2:
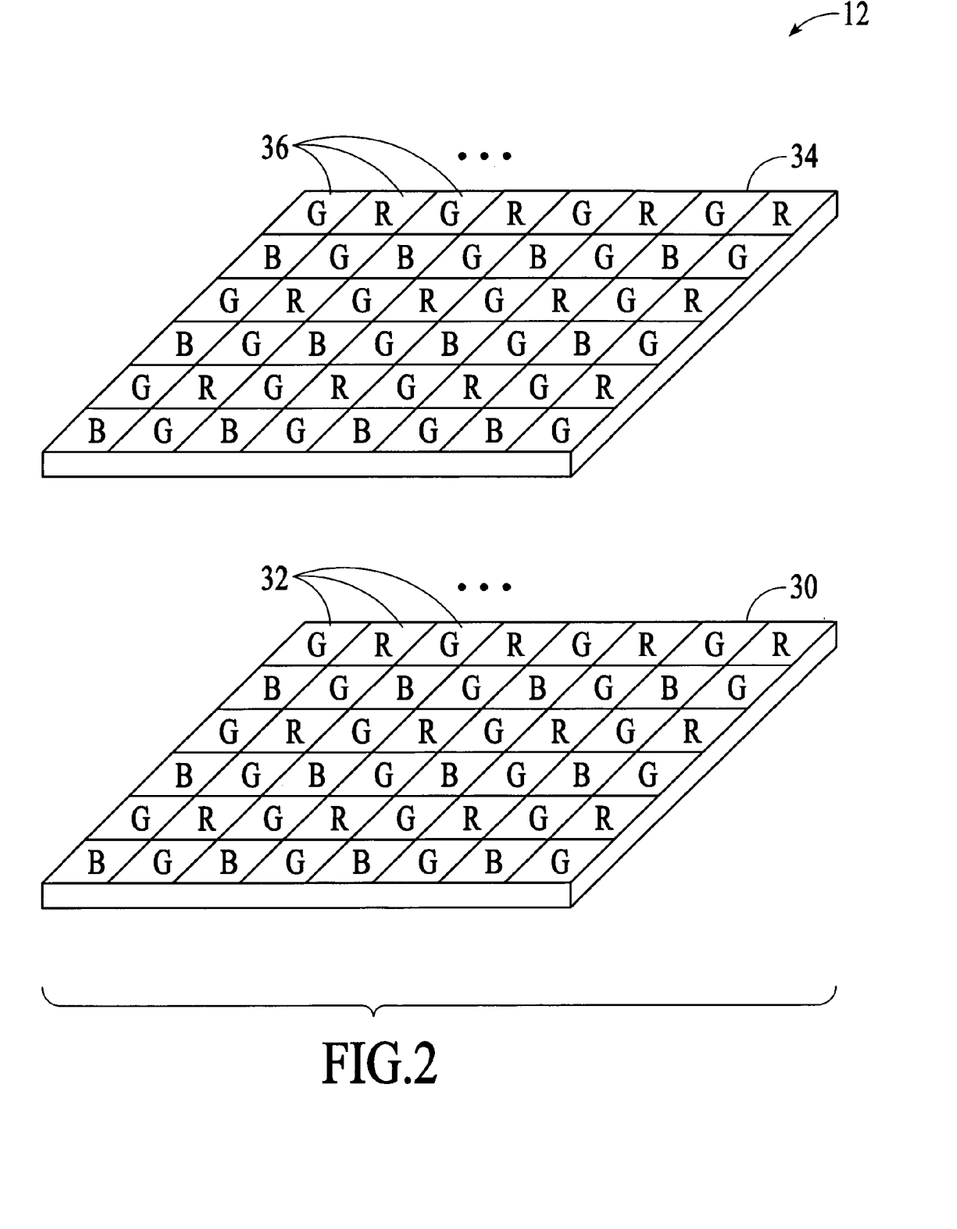
FIG. 2 is an exploded view of a color image sensor of the digital imaging device of FIG. 1 in accordance with an embodiment of the invention.

The color image sensor 12 is configured to electronically capture the focused image by generating image signals in the form of accumulated electrical charges in response to impinging light at different photosensitive locations on the image sensor. As shown in FIG. 2, which is an exploded view of the color image sensor 12, the image sensor includes an imaging array 30 of photosensitive elements 32 and a color filtering array (CFA) 34. Each photosensitive element 32 of the imaging array 30 accumulates an electrical charge when light is impinging upon that element, thereby producing an analog image signal. Thus, the photosensitive elements 32 of the imaging array 30 can be considered to be photosensitive locations or pixels of the image sensor 12. As an example, the imaging array 30 may be a charged coupled device (CCD) array or a complementary metal-oxide semiconductor (CMOS) array.

The CFA 34 of the color image sensor 12 includes color pass filters 36 that are arranged in a predefined pattern. In the illustrated embodiment, the CFA 34 includes red (R), green (G) and blue (B) pass filters 36 that are arranged in a Bayer pattern. The CFA 34 is positioned over the imaging array 30 and faces the lens 18 to selectively transmit certain color lights to the photosensitive elements 32 of the imaging array through the color pass filters 36. Thus, the light that impinges upon each photosensitive element 32 of the imaging array 30 depends on the color pass filter 36 of CFA 34 that is positioned over that photosensitive element. Since the incident light on each photosensitive element 32 of the imaging array 30 depends on the color pass filter 36 over that photosensitive element, each photosensitive element will sometimes be referred to herein as R, G or B photosensitive element, depending on the color pass filter positioned over that photosensitive element.

The R pass filters 36 of the CFA 34 allow red color light to be transmitted. Similarly, the G and B pass filters 36 of the CFA 34 allow green and blue lights, respectively, to be transmitted. In addition to the respective color light, each of these color pass filters 36 also allows infrared light, if any, to be transmitted. Thus, if the IR flash 16 is used and the IR filter 19 is not positioned in front of the color image sensor 12, the light received by the R photosensitive elements 32 includes both red and infrared light components, which are reflected in the analog image signals ("$R_0$") generated by the R photosensitive elements. Similarly, if the IR flash 16 is used and the IR filter 19 is not positioned in front of the color image sensor 12, the light received by the G photosensitive elements 32 includes both green and infrared components, which are reflected in the analog image signals ("$G_0$") generated by the G photosensitive elements, and the light received by the B photosensitive elements 32 includes both blue and infrared light components, which are reflected in the analog image signals ("$B_0$") generated by the B photosensitive elements. Thus, when the IR flash 16 is used and the IR filter 19 is not positioned in front of the color image sensor 12, the $R_0$, $G_0$ and $B_0$ analog image signals generated by the R, G and B photosensitive elements 32 of the imaging sensor 30 can be mathematically expressed as follows:

$$R_0 = R + IR, \ G_0 = G + IR, \text{ and } B_0 = B + IR,$$

where R, G, B and IR represent red, green, blue and infrared light components, respectively. For a single exposure period using the IR flash 16 without the IR filter 19, the R, G and B photosensitive elements 32 of the imaging sensor 30 produces a frame of $R_0$, $G_0$ and $B_0$ analog image signals, which is equivalent to a single captured image of a scene of interest.

However, when the IR flash 16 is not used and the IR filter 19 is positioned in front of the color image sensor 12, the R, G and B pass filters 36 of the CFA 34 allow only red, green and blue color lights, respectively, to be transmitted since no infrared light will be received by the CFA. As a result, all of the light received at each photosensitive element 32 of the imaging array 30 is either red, green or blue color light, depending on the color pass filter 36 of the CFA 34 positioned over that photosensitive element. Thus, if the IR flash 16 is not used and the IR filter 19 is positioned in front of the color image sensor 12, the light received by the R photosensitive elements 32 of the imaging array 30 include only red light components, which are reflected in the analog image signals ("$R_0$") generated by the R photosensitive elements. Similarly, if the IR flash 16 is not used and the IR filter 19 is positioned in front of the color image sensor 12, the light received by the G photosensitive elements 32 includes only green light components, which are reflected in the analog image signals ("$G_1$") generated by the G photosensitive elements, and the light received by the B photosensitive elements 32 includes only blue light components, which are reflected in the analog image signals ("$B_1$") generated by the B photosensitive elements. Thus, when the IR flash 16 is not used and the IR filter 19 is positioned in front of the color image sensor 12, the $R_1$, $G_1$ and $B_1$, analog image signals generated by the R, G and B photosensitive elements 32 of the imaging sensor 30 can be mathematically expressed as follows:

$$R_1 = R, \ G_1 = G, \text{ and } B_1 = B$$

For a single exposure period without using the IR flash 16 and with the IR filter 19 being positioned in front of the color image sensor 12, the R, G and B photosensitive elements 32 of the imaging sensor 30 produces a frame of $R_1$, $G_1$ and $B_1$, analog image signals, which is equivalent to a single captured image of a scene of interest.

Turning back to FIG. 1, the analog image signals generated by the photosensitive elements 32 of the image sensor 12 in the form of accumulated electrical charges are converted to corresponding digital signals by the ADC 22. The digital image signals are then transmitted to the processor 24 for signal processing.

The processor 24 of the imaging device 10 processes the digital image signals from the ADC 22 to produce a digital image of the captured scene of interest. As described in more detail below, the processor 24 processes at least two frames of digital image signals of the same scene of interest to produce a high-quality color image even under a low lighting condition. The processor 24 may also perform other tasks, such as demosaicing, image enhancements and compression. The resulting high-quality digital color image is stored in the storage device 26, which may include a removable memory card. The processor 24 also controls various active components of the imaging device 10, such as the IR flash 16, the focusing mechanism 20, the image sensor 12 and the ADC 22. The processor 24 also performs operations commanded by a user through the user input interface 14.

The digital imaging device 10 includes other components that are commonly found in conventional digital cameras, which are not shown or described herein so that the inventive features of the imaging device are not obscured.

Figure 3:
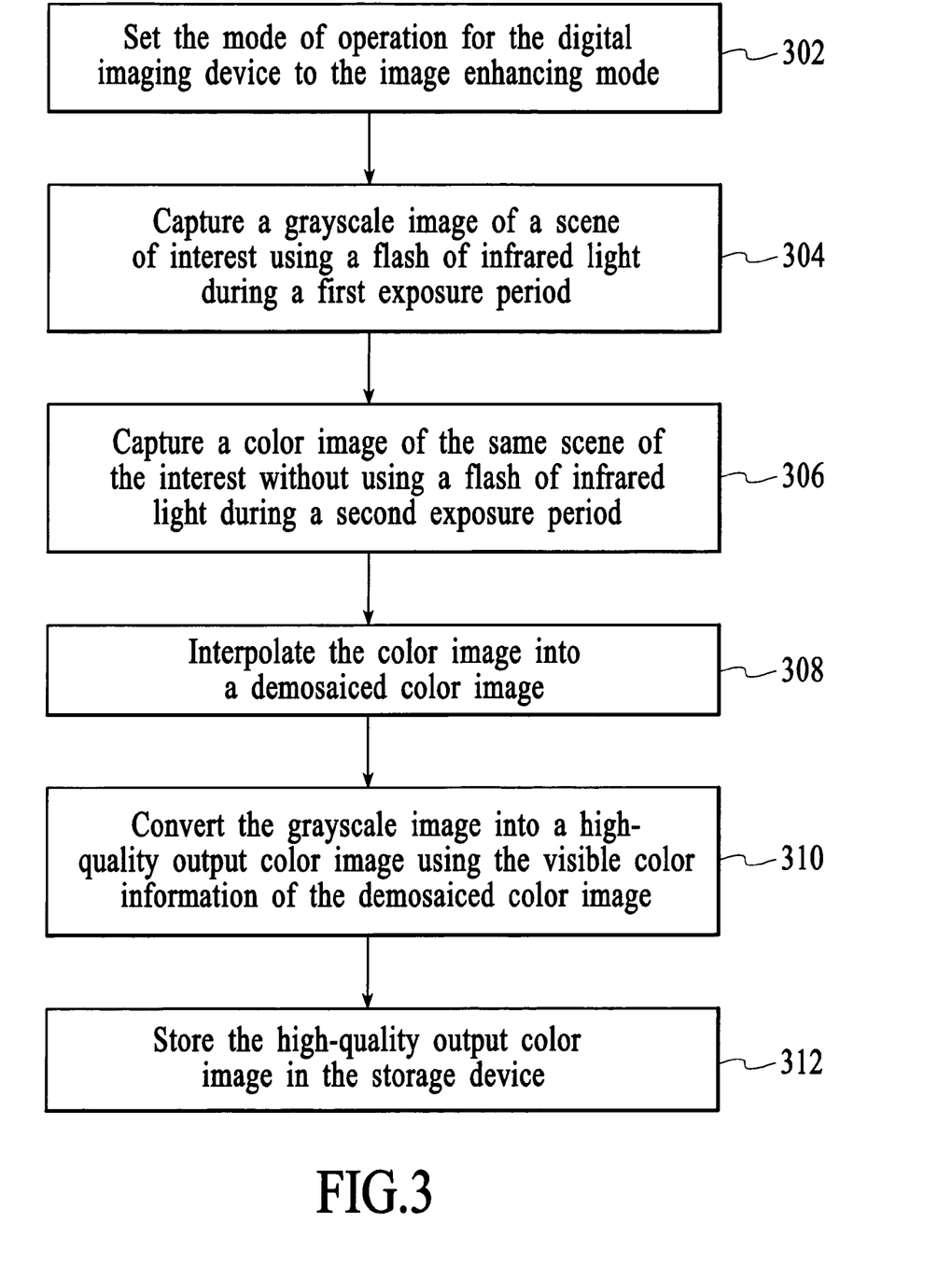
FIG. 3 is a flow diagram of an image enhancing operation of the digital imaging device of FIG. 1 in accordance with an embodiment of the invention.

An image enhancing operation of the digital imaging device 10 in accordance with an embodiment of the invention is now described with reference to a flow diagram of FIG. 3. The image enhancing operation produces a high-quality color image of a scene of interest even when captured under a low lighting condition. At block 302, the mode of operation for the digital imaging device 10 is set to the image enhancing mode. The setting of the operational mode to the image enhancing mode can be executed in response to a user input made using the user input interface 14. Alternatively, the setting of the operational mode to the image enhancing mode can be executed automatically by the digital imaging device 10 by sensing the ambient lighting condition using a sensor (not shown).

Next, at block 304, a grayscale image of a scene of interest is captured using a flash of infrared light, which is produced by the IR flash 16, during a first exposure period without the IR filter 19 being positioned in front of the color image sensor 12. This grayscale image is captured as a frame of $R_0$, $G_0$ and $B_0$ analog image signals, which are generated by the R, G and B photosensitive elements 32 of the color image sensor 12. The $R_0$, $G_0$ and $B_0$ analog image signals are then converted to $R_0$, $G_0$ and $B_0$ digital image signals by the ADC 22. Since each of the $R_0$, $G_0$ and $B_0$ digital image signals includes both red, green or blue color component and infrared component, each of the $R_0$, $G_0$ and $B_0$ digital image signals includes grayscale information, which is derived from the respective color and infrared components. The frame of $R_0$, $G_0$ and $B_0$ digital image signals is converted into the grayscale image and may be temporarily stored in the storage device 26.

Figure 4:
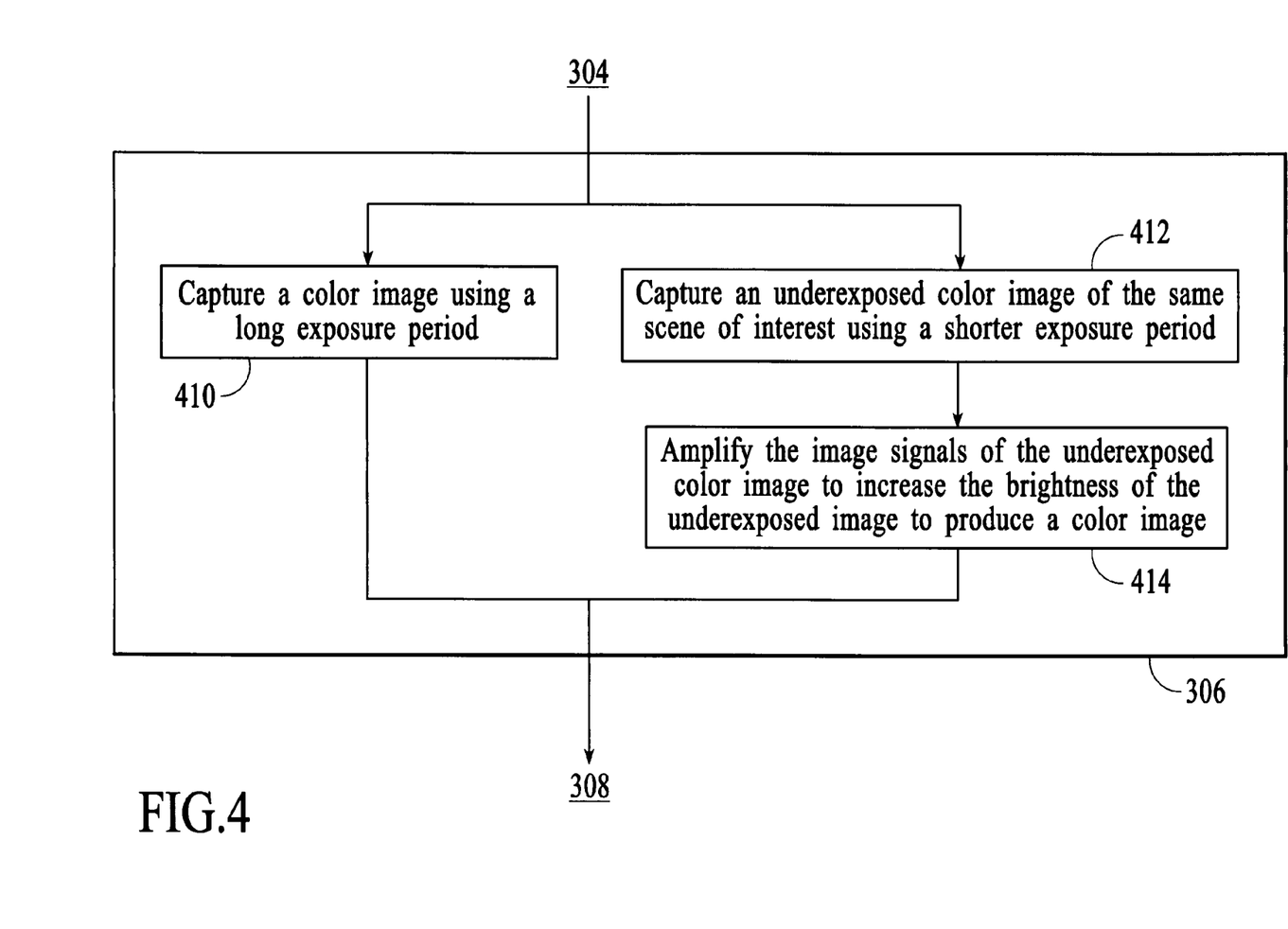
FIG. 4 is part of the flow diagram of FIG. 3, illustrating different techniques to capture a color rich image under a low lighting condition in accordance with an embodiment of the invention.

Next, at block 306, a color image of the same scene of interest is captured without using a flash of infrared light during a second exposure period with the IR filter 19 being positioned in front of the color image sensor 12. The color image is rich in visible color information of the scene of interest. However, the quality of the color image with respect to sharpness and clarity is significantly lower than the grayscale image. As illustrated in FIG. 4, there are different techniques to capture a color rich image under a low lighting condition. Although only two techniques to capture a color rich image under a low lighting condition are described herein, other techniques are possible. In accordance with one technique, at block 410, the color image is captured using a long exposure period. This long exposure period is significantly longer than the first exposure period used to capture the grayscale image. As an example, the long exposure period may be ten times longer (e.g., ⅓ second) than the first exposure period (e.g., ½0 second) used to capture the grayscale image. In accordance with an alternative technique, at block 412, an underexposed color image of the same scene of interest is captured using a shorter exposure period, which can be same as the first exposure period for the grayscale image, and then, at block 414, the image signals of the underexposed color image are amplified to increase the brightness of the underexposed image to produce the color image. The same effect can be achieved by setting the ISO parameter of the digital imaging device 10 to a high value. This alternative technique, however, introduces significant amount of noise into the resulting color image. The noise can be reduced, however, by limiting how much the signal can vary from one image pixel to the next. Alternatively, the noise can be reduced by averaging the signal of each image pixel with the signals from neighboring image pixels.

Next, at block 308, the color image is interpolated into a demosaiced color image such that each image pixel of the resulting color image contains red, green and blue components, representing red, green and blue intensity values of that pixel. Any color interpolation process can be used to produce the demosaiced color image. As an example, the missing color components of an image pixel of the color image can be obtained by averaging the signals from surrounding image pixels containing the missing color information. The demosaiced color image may be temporarily stored in the storage device 26.

Figure 5:
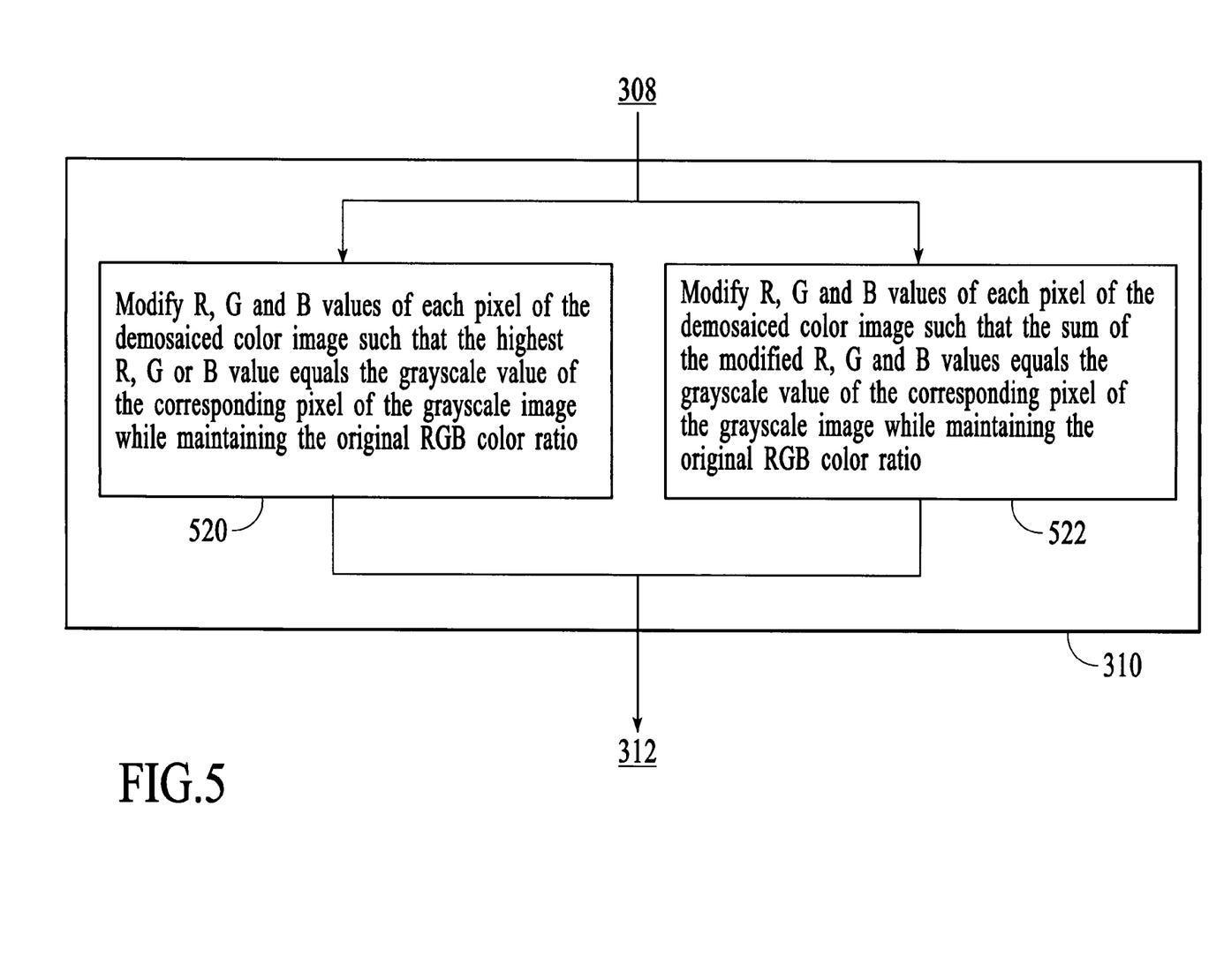
FIG. 5 is part of the flow diagram of FIG. 3, illustrating different techniques to convert a grayscale image into a high-quality output color image in accordance with an embodiment of the invention.

Next, at block 310, the grayscale image is converted into a high-quality output color image using the visible color information of the demosaiced color image. That is, the grayscale image is "colorized" using the visible color information of the demosaiced color image. This process can be compared to a process of "colorizing" an old black-and-white image. As illustrated in FIG. 5, there are different techniques to convert the grayscale image into the high-quality output color image. Although only two techniques to convert the infrared image into the high-quality output color image are described herein, other techniques are possible. In accordance with one technique, at block 520, the red, green and blue values of each pixel of the demosaiced color image are modified such that the highest red, green or blue value equals the grayscale value of the corresponding pixel of the grayscale image while maintaining the original red, green and blue color ratio. These modified red, green and blue values will then be used in a corresponding pixel of the high-quality color image. As an example, if the grayscale value at a particular pixel of the grayscale image is 152 out of 255 steps and the red, green and blue color ratio at a corresponding pixel of the demosaiced color image is 1:3:2, then the modified red, green and blue values would be 51, 152 and 101, respectively. In accordance with an alternative technique, at block 522, the red, green and blue values of each pixel of the demosaiced color image are modified so that the sum of the modified red, green and blue values equals the grayscale value of the corresponding pixel of the grayscale image while maintaining the original red, green and blue color ratio. These modified red, green and blue values will then be used in a corresponding pixel of the high-quality color image. As an example, if the grayscale value at a particular pixel of the grayscale image is 152 out of 255 steps and the red, green and blue color ratio at a corresponding pixel of the demosaiced color image is 1:3:2, then the modified red, green and blue values would be 25.3, 76 and 50.6, respectively, since the sum of the modified red, green and blue values (25.3+76+50.6=152) equals the grayscale value (152). In either technique, the grayscale information from the grayscale image and the visible color information from the demosaiced color image are combined to produce the high-quality output color image.

Next, at block 316, the high-quality output color image is stored in the storage device 126.

Figure 6:
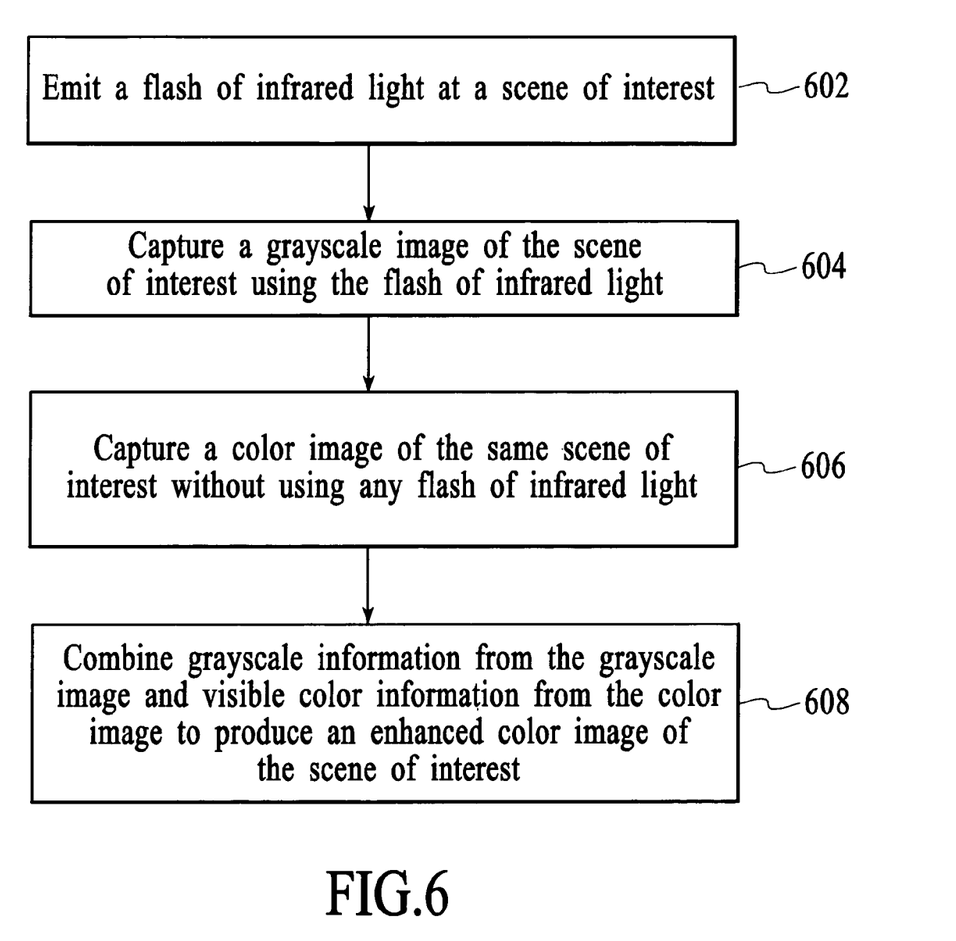
FIG. 6 is a flow diagram of a method for producing an enhanced color image of a scene of interest in accordance with an embodiment of the invention.

A method for producing an enhanced color image of a scene of interest in accordance with an embodiment of the invention is described with reference to the flow diagram of FIG. 6. At block 602, a flash of infrared light is emitted at the scene of interest. Next, at block 604, a grayscale image of the scene of interest is electronically captured using the flash of infrared light. Each pixel of the grayscale image includes grayscale information for a particular location of the scene of interest. The grayscale information is derived from both infrared light and visible color light. Next, at block 606, a color image of the same scene of interest is electronically captured without using any flash of infrared light. Each pixel of the color image includes visible color information for a particular location of the scene of interest. Next, at block 608, the grayscale information from the grayscale image and the visible color information from the color image are combined to produce the enhanced color image of the scene of interest.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for producing an enhanced color image of a scene of interest, said method comprising:
   electronically capturing a grayscale image of said scene of interest, said grayscale image containing visible and infrared image information;
   electronically capturing a color image of said scene of interest by using an infrared filter for blocking infrared light, whereby said color image contains visible image information and precludes infrared image information; and
   combining grayscale information derived from the visible and the infrared image information contained in said grayscale image, with the visible image information from said color image to produce said enhanced color image of said scene of interest, wherein said combining comprises using a grayscale value of a first pixel in the grayscale image to modify the red, green, blue (RGB) values of a corresponding pixel in said color image, the modification of the RGB values being carried out without modifying the RGB color ratio of said corresponding pixel.

2. The method of claim 1 wherein said electronically capturing said grayscale image includes:
   directing a flash of infrared light at said scene of interest.

3. The method of claim 1 wherein said electronically capturing said color image includes capturing said color image of said scene of interest using an exposure period that is longer than an exposure period used to capture said grayscale image.

4. The method of claim 1 wherein said electronically capturing said color image includes capturing an underexposed color image of said scene of interest and increasing the brightness of said underexposed color image to produce said color image.

5. The method of claim 1 wherein said electronically capturing said color image includes capturing a frame of image signals and interpolating said image signals to produce a demosaiced color image so that each pixel of said demosaiced color image includes different visible color values.

6. The method of claim 1 wherein said combining includes:
   modifying different visible color values for each pixel of said color image into modified visible color values such that one of said modified visible color values equals a grayscale value of a corresponding pixel of said grayscale image while maintaining the original ratio of said different visible color values in order to produce said enhanced color image.

7. The method of claim 1 wherein said combining includes:
   modifying different visible color values for each pixel of said color image into modified visible color values such that sum of said modified visible color values equals a grayscale value of a corresponding pixel of said grayscale image while maintaining the original ratio of said different visible color values in order to produce said enhanced color image.

8. A device for producing an enhanced color image of a scene of interest, said device comprising:
   an infrared filter for blocking infrared light;
   a color image sensor operable to electronically capture images; and
   a processor operable to process two frames of digital image information, wherein a first frame is generated by capturing a grayscale image of said scene of interest without inserting said infrared filter in front of said color image sensor, and wherein a second frame is generated by capturing a color image of said scene of interest with said infrared filter inserted in front of said color image sensor, said processor further operable to combine grayscale information from said grayscale image with visible color information from said color image to produce said enhanced color image of said scene of interest, wherein combining grayscale information with visible color information comprises using a grayscale value of a first pixel in the grayscale image to modify the red, green, blue (RGB) values of a corresponding pixel in said color image, the modification of the RGB values being carried out without modifying the RGB color ratio of said corresponding pixel.

9. The device of claim 8 wherein said processor is operable to control said infrared flash and said color image sensor to capture image signals using said flash of infrared light.

10. The device of claim 8 wherein said processor is operable to control said infrared flash and said color image sensor to capture said color image of said scene of interest using an exposure period that is longer than an exposure period used to capture said grayscale image.

11. The device of claim 8 wherein said processor is operable to control said infrared flash and said color image sensor to capture an underexposed color image of said scene of interest, said processor being further operable to increase the brightness of said underexposed color image to produce said color image.

12. The device of claim 8 wherein said processor is operable to control said infrared flash and said color image sensor to capture a frame of image signals, said processor being further operable to interpolate said image signals to produce said color image so that each pixel of said color image includes different visible color values.

13. The device of claim 9 further comprising an infrared flash operable to direct infrared light to said scene of interest.

14. The device of claim 12 wherein said processor is operable to modify said different visible color values for each pixel of said color image to modified visible color values such that one of said modified visible color values equals a grayscale value of a corresponding pixel of said grayscale image while maintaining the original ratio of said different visible color values in order to produce said enhanced color image.

15. The device of claim 12 wherein said processor is operable to modify said different visible color values for each pixel of said color image into modified visible color values such that sum of said modified visible color values equals a grayscale value of a corresponding pixel of said grayscale image while maintaining the original ratio of said different visible color values in order to produce said enhanced color image.

16. A method for producing an enhanced color image of a scene of interest, said method comprising:
   emitting a flash of infrared light at said scene of interest;

electronically capturing a grayscale image of said scene of interest using said flash of infrared light, said grayscale image containing grayscale information of said scene of interest;

using an infrared filter to block infrared light while electronically capturing a color image of said scene of interest without using any flash of infrared light, whereby said color image contains only visible color information of said scene of interest; and combining said grayscale information from said grayscale image with said visible color information from said color image to produce said enhanced color image of said scene of interest, wherein said combining comprises using a grayscale value of a first pixel in the grayscale image to modify the red, green, blue (RGB) values of a corresponding pixel in said color image, the modification of the RGB values being carried out without modifying the RGB color ratio of said corresponding pixel.

17. The method of claim 16 wherein said electronically capturing said grayscale image includes:

capturing a frame of image signals using said flash of infrared light, at least some of said image signals of said frame including infrared components and visible color components; and converting said frame of image signals into said grayscale image.

18. The method of claim 16 wherein said capturing said color image includes capturing said color image of said scene of interest using an exposure period that is longer than an exposure period used to capture said grayscale image.

19. The method of claim 16 wherein said combining includes modifying different visible color values for each pixel of said color image into modified visible color values such that one of said modified visible color values equals a grayscale value of a corresponding pixel of said grayscale image while maintaining the original ratio of said different visible color values in order to produce said enhanced color image.

* * * * *

UNITED STATES PATENT AND TRADEMARK OFFICE
CERTIFICATE OF CORRECTION

PATENT NO. : 7,609,291 B2
APPLICATION NO. : 11/296635
DATED : October 27, 2009
INVENTOR(S) : Chin Hin Oon It is certified that error appears in the above-identified patent and that said Letters Patent is hereby corrected as shown below:

Column 8, Line 47, Claim 13, delete "claim 9" and insert -- claim 8 --.

Signed and Sealed this
Twenty-sixth Day of February, 2013

Teresa Stanek Rea
*Acting Director of the United States Patent and Trademark Office*